US011431528B2

(12) United States Patent
Qin et al.

(10) Patent No.: US 11,431,528 B2
(45) Date of Patent: Aug. 30, 2022

(54) SOUNDING REFERENCE SIGNAL (SRS) CONFIGURATION METHOD, AND APPARATUS

(71) Applicant: HUAWEI TECHNOLOGIES CO., LTD., Guangdong (CN)

(72) Inventors: Yi Qin, Kista (SE); Shengyue Dou, Shanghai (CN); Jianqin Liu, Beijing (CN); Yongzhao Cao, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 161 days.

(21) Appl. No.: 16/922,771

(22) Filed: Jul. 7, 2020

(65) Prior Publication Data

US 2020/0336340 A1    Oct. 22, 2020

Related U.S. Application Data

(63) Continuation of application No. PCT/CN2018/123784, filed on Dec. 26, 2018.

(30) Foreign Application Priority Data

Jan. 12, 2018   (CN) .......................... 201810032482.7

(51) Int. Cl.
*H04W 72/04* (2009.01)
*H04L 25/02* (2006.01)
*H04L 5/00* (2006.01)

(52) U.S. Cl.
CPC .......... *H04L 25/0226* (2013.01); *H04L 5/005* (2013.01); *H04W 72/042* (2013.01); *H04W 72/0446* (2013.01)

(58) Field of Classification Search
CPC .......... H04W 72/042; H04W 72/0446; H04W 72/1284; H04W 72/1226; H04L 25/0226;
(Continued)

(56) References Cited

U.S. PATENT DOCUMENTS

2010/0080187 A1    4/2010   Papasakellariou et al.
2013/0294318 A1*  11/2013   Amerga .................. H04W 4/06
                                                        370/312
(Continued)

FOREIGN PATENT DOCUMENTS

| CN | 101917765 A | 12/2010 |
| CN | 102595514 A | 7/2012 |

(Continued)

OTHER PUBLICATIONS

Huawei et al., "Remaining details of SRS design", 3GPP TSG RAN WG1 Meeting#91, R1-1719441, Reno, USA, Nov. 27-Dec. 1, 2017, 12 pages.
(Continued)

*Primary Examiner* — Wei Zhao
(74) *Attorney, Agent, or Firm* — Fish & Richardson P.C.

(57) ABSTRACT

This application relates to the field of wireless communications technologies, and in particular, to a sounding reference information (SRS) transmission method, to resolve a problem of when to transmit an SRS. In the method, user equipment (UE) receives SRS resource configuration information sent by a base station. The UE receives downlink control information (DCI) sent by the base station. The UE sends an SRS in a determined slot and symbol, where the determined symbol is determined by the UE based on the SRS resource configuration information.

18 Claims, 3 Drawing Sheets

(58) Field of Classification Search
CPC ..... H04L 5/0023; H04L 5/005; H04L 5/0048; H04L 5/0094
See application file for complete search history.

(56) References Cited

U.S. PATENT DOCUMENTS

| | | |
|---|---|---|
| 2016/0192388 A1 | 6/2016 | Ekpenyong et al. |
| 2017/0288832 A1 | 10/2017 | Islam et al. |
| 2017/0331606 A1 | 11/2017 | Chen et al. |
| 2019/0190582 A1* | 6/2019 | Guo ................... H04W 72/046 |
| 2021/0083825 A1* | 3/2021 | Choi ..................... H04L 5/0051 |

FOREIGN PATENT DOCUMENTS

| | | |
|---|---|---|
| CN | 104639223 A | 5/2015 |
| CN | 106233658 A | 12/2016 |
| CN | 107294686 A | 10/2017 |

OTHER PUBLICATIONS

PCT International Search Report and Written Opinion in International Application No. PCT/CN2018/123,784, dated Feb. 27, 2019, 14 pages (With English Translation).

Office Action issued in Chinese Application No. 201810032482.7 dated Mar. 2, 2021, 7 pages.

Extended European Search Report issued in European Application No. 18899154.1 dated Dec. 17, 2020, 10 pages.

\* cited by examiner

SOUNDING REFERENCE SIGNAL (SRS) CONFIGURATION METHOD, AND APPARATUS

CROSS-REFERENCE TO RELATED APPLICATIONS

This application is a continuation of International Application No. PCT/CN2018/123784, filed on Dec. 26, 2018, which claims priority to Chinese Patent Application No. 201810032482.7, filed on Jan. 12, 2018. The disclosures of the aforementioned applications are hereby incorporated by reference in their entireties.

TECHNICAL FIELD

This application relates to the field of wireless communications technologies, and in particular, to a sounding reference signal (SRS) configuration method and an apparatus in a wireless communications system.

BACKGROUND

Currently, user equipment (UE) implements uplink measurement by sending a sounding reference signal (SRS), and a base station measures a received SRS to obtain uplink channel state information.

After the base station configures a time resource, a frequency resource, and a code domain resource that are used to transmit the SRS, the UE may transmit the SRS on a resource configured by the base station. After receiving the SRS, the base station obtains the uplink channel state information.

However, after the UE receives SRS configuration information sent by the base station, when to transmit the SRS is a problem that needs to be resolved.

SUMMARY

This specification describes an SRS transmission method, and determination of a time for transmitting an SRS.

According to a first aspect, this application provides an SRS transmission method. The method includes: receiving, by user equipment UE, SRS resource configuration information sent by a base station; receiving, by the UE, downlink control information downlink control information (DCI) sent by the base station; and sending, by the UE, an SRS in a determined slot and symbol, where the determined symbol is determined by the UE based on the SRS resource configuration information. Therefore, the UE may determine, based on the SRS resource configuration, the symbol for sending the SRS, and may further determine the slot for sending the SRS, thereby resolving a problem of when to transmit the SRS.

In a possible design, if the UE receives the DCI in an $n^{th}$ slot, the slot that is determined by the UE and in which the SRS is sent is an $(n+k)^{th}$ slot, and $k=k0+k1+(X-1)+\Delta DL$; $k=k0+k1+\Delta DL$; $k=k1+\Delta DL$; $k=k1+\Delta DL$; $k=k0+(X-1)+\Delta DL$; $k=k1+(X-1)+\Delta DL$; $k=k0+k1+(X-1)$; $k=k0+k1$; $k=k1$; $k=k0$; $k=k0+(X-1)$; or $k=k1+(X-1)$, where k0 is a quantity of slots between the DCI and a first slot in which downlink transmission scheduled by the DCI is located, k1 is a quantity of slots between an end of the downlink transmission and an uplink feedback corresponding to the downlink transmission, X is 1 or a quantity of slots in slot aggregation during the downlink transmission, and $\Delta DL$ is a configured value, or $\Delta DL$ is determined based on a symbol occupied by a channel of the uplink feedback, or $\Delta DL$ is a value determined based on a slot that may be used to transmit the SRS. Therefore, the DCI received by the UE is downlink DCI, and the UE may determine, based on current k0, k1, k2, and some other parameters, a time for transmitting the SRS. Compared with the prior art in which SRS transmission is determined based on configuration information that needs to be based on a period or an offset, signaling overheads can be reduced, and the SRS can be transmitted more flexibly.

In a possible design, if the UE receives the DCI in an $n^{th}$ slot, the slot that is determined by the UE and in which the SRS is sent is an $(n+k)^{th}$ slot, and $k=k2+\Delta UL$, or $k=k2$, where k2 is a slot interval between the DCI and uplink transmission scheduled by the DCI, and $\Delta UL$ is a configured value, or $\Delta UL$ is determined based on a symbol occupied by a channel of the uplink transmission, or $\Delta UL$ is a value determined based on a slot for transmitting the SRS, or $\Delta UL$ is a value determined based on a quantity of slots in slot aggregation during the uplink transmission. Therefore, the DCI received by the UE is uplink DCI, and the UE may determine, based on current k2 and $\Delta UL$, a time for transmitting the SRS. Compared with the prior art in which SRS transmission is determined based on configuration information that needs to be based on a period or an offset, signaling overheads can be reduced, and the SRS can be transmitted more flexibly.

In a possible design, if the UE receives the DCI in an $n^{th}$ slot, the slot that is determined by the UE and in which the SRS is sent is an $(n+k)^{th}$ slot, and the DCI may include content used to indicate a k value. For example, a field in the DCI indicates the k value, and one of a plurality of candidate values may be selected as the k value. Alternatively, the DCI includes content used to indicate that the k value is a value in a candidate set of k values. The candidate set of the k values may be a candidate set of k0 values, a candidate set of k1 values, or a candidate set of k2 values, or the candidate set of the k values is configured by using higher layer signaling. Therefore, the UE may determine, based on the indication of the k value in the DCI or the higher layer signaling, the time for transmitting the SRS, so that signaling overheads can be reduced, and the SRS can be transmitted more flexibly. The candidate set of the k0 values is a candidate set of a quantity of slots between the DCI and a first slot in which downlink transmission scheduled by the DCI is located, the candidate set of the k1 values is a candidate set of a quantity of slots between an end of the downlink transmission scheduled by the DCI and an uplink feedback corresponding to the downlink transmission, and the candidate set of the k2 values is a candidate set of slot intervals between the DCI and uplink transmission scheduled by the DCI.

In a possible design, the SRS resource configuration information includes information used to indicate the symbol for transmitting the SRS, the information used to indicate the symbol for transmitting the SRS is used to indicate content including a location of a start symbol S of a resource, in one slot, for transmitting the SRS, a quantity N of symbols of the resource for transmitting the SRS, and a repetition factor r of the resource for transmitting the SRS, and any two of S, N, or r are jointly encoded, or S. N, and r are jointly encoded. Joint encoding performed on any two or three of S, N. and r meets a specific constraint relationship, so that overheads can be effectively reduced, and incorrect configuration can be avoided.

In a possible design, the SRS resource configuration information includes configuration information used to indicate an SRS resource set, the SRS resource set includes one or more SRS resources, and the SRS resource configuration information further includes information used to indicate that the SRS resource set has at least two of four functions: beam management, antenna polling (antenna switching), codebook-based transmission, and non-codebook-based transmission. In this way, a quantity of times of sending the SRS can be reduced, and a plurality of functions are implemented by transmitting a relatively small quantity of SRSs.

According to a second aspect, this application provides an SRS transmission method. A base station sends SRS resource configuration information to user equipment UE; the base station sends downlink control information DCI to the UE; and the base station receives an SRS sent by the UE based on the SRS resource configuration information. Therefore, after receiving the SRS resource configuration information and the DCI that are transmitted by the base station, the UE may determine when to transmit the SRS.

In a possible design, the base station sends the DCI to the UE in an $n^{th}$ slot, and receives the SRS in an $(n+k)^{th}$ slot. The DCI includes content used to indicate a k value, or the DCI includes content used to indicate that the k value is one of a candidate set of k values, and the candidate set of the k values is one of the following: a candidate set of k0 values, a candidate set of k1 values, and a candidate set of k2 values. The candidate set of the k0 values is a candidate set of a quantity of slots between the DCI and a first slot in which downlink transmission scheduled by the DCI is located. The candidate set of the k1 values is a candidate set of a quantity of slots between an end of the downlink transmission scheduled by the DC and an uplink feedback corresponding to the downlink transmission. The candidate set of the k2 values is a candidate set of slot intervals between the DCI and uplink transmission scheduled by the DCI.

In a possible design, the SRS resource configuration information includes information used to indicate a symbol for transmitting the SRS, the information used to indicate the symbol for transmitting the SRS is used to indicate content including a location of a start symbol S of a resource, in one slot, for transmitting the SRS, a quantity N of symbols of the resource for transmitting the SRS, and a repetition factor r of the resource for transmitting the SRS, and any two of S, N, or r are jointly encoded, or S, N, and r are jointly encoded.

In a possible design, the SRS resource configuration information includes configuration information used to indicate an SRS resource set, the SRS resource set includes one or more SRS resources, and the SRS resource configuration information further includes information used to indicate that the SRS resource set has at least two of four functions: beam management, antenna polling (antenna switching), codebook-based transmission, and non-codebook-based transmission.

According to a third aspect, this application provides an apparatus. The apparatus has functions of implementing the terminal device in the method design of the first aspect. The functions may be implemented by hardware, or may be implemented by hardware executing corresponding software. The hardware or software includes one or more units corresponding to the foregoing functions.

According to a fourth aspect, this application provides an apparatus. The apparatus has functions of the terminal device in the method design of the second aspect. The functions may be implemented by hardware, or may be implemented by hardware executing corresponding software. The hardware or software includes one or more units corresponding to the foregoing functions.

According to a fifth aspect, this application provides user equipment. The user equipment includes a transceiver, a processor, and a memory. The processor is configured to control the transceiver to send and receive a signal, the memory is configured to store a computer program, and the processor is configured to invoke, from the memory, and run the computer program, to enable the terminal device to perform the method in the first aspect.

According to a sixth aspect, this application provides a network device. The network device includes a transceiver, a processor, and a memory. The processor is configured to control the transceiver to send and receive a signal, the memory is configured to store a computer program, and the processor is configured to invoke, from the memory, and run the computer program, to enable the network device to perform the method in the second aspect.

According to a seventh aspect, this application provides a communications apparatus. The communications apparatus may be the user equipment in the foregoing method designs, or may be a chip disposed in user equipment. The communications apparatus includes: a memory, configured to store computer-executable program code; a communications interface; and a processor. The processor is coupled to the memory and the communications interface. The program code stored in the memory includes an instruction. When the processor executes the instruction, the communications apparatus is enabled to perform the method performed by the user equipment in any one of the possible designs of the first aspect or the second aspect.

According to an eighth aspect, this application provides a communications apparatus. The communications apparatus includes that the communications apparatus may be the network device in the foregoing method designs, or may be a chip disposed in a network device. The communications apparatus includes: a memory, configured to store computer-executable program code; a communications interface; and a processor. The processor is coupled to the memory and the communications interface. The program code stored in the memory includes an instruction. When the processor executes the instruction, the communications apparatus is enabled to perform the method performed by the network device in any one of the possible designs of the first aspect or the second aspect.

According to a ninth aspect, this application provides a computer program product. The computer program product includes computer program code, and when the computer program code is run on a computer, the computer is enabled to perform the method in the foregoing aspects.

According to a tenth aspect, a computer-readable medium is provided. The computer-readable medium stores program code, and when the computer program code is run on a computer, the computer is enabled to perform the method in the foregoing aspects.

According to an eleventh aspect, this application provides a chip system. The chip system includes a processor, configured to support user equipment in implementing functions in the foregoing aspects, for example, receiving or processing data and/or information in the foregoing method. In a possible design, the chip system further includes a memory. The memory is configured to store a program instruction and data that are necessary for the user equipment. The chip system may include a chip or may include a chip and another discrete device.

According to a twelfth aspect, this application provides a chip system. The chip system includes a processor, configured to support a network device in implementing functions in the foregoing aspects, for example, sending or processing data and/or information in the foregoing method. In a possible design, the chip system further includes a memory, and the memory is configured to store a program instruction and data that are necessary for the network device. The chip system may include a chip or may include a chip and another discrete device.

In embodiments of this application, the user equipment UE receives the SRS resource configuration information sent by the base station. The UE receives the downlink control information DCI sent by the base station. The UE sends the SRS in the determined slot and symbol, where the determined symbol is determined by the UE based on the SRS resource configuration information. In the SRS resource configuration information, at least two of the location of the start symbol S of the resource, in one slot, for transmitting the SRS, the quantity N of symbols of the resource for transmitting the SRS, and the repetition factor r of the resource for transmitting the SRS meet a constraint relationship. The location of the start symbol S of the resource, in one slot, for transmitting the SRS, the quantity N of symbols of the resource for transmitting the SRS, and the repetition factor r of the resource for transmitting the SRS are jointly encoded, and there is no need to separately configure the three parameters. This can effectively reduce configuration overheads and avoid incorrect configuration. By using current k0, k1, k2, and some other parameters, the UE may determine the time for sending the SRS. In this way, the signaling overheads can be reduced, and the SRS transmission performed through period-based or offset-based configuration information in the prior art is avoided, so that a time for triggering the SRS is more flexible.

BRIEF DESCRIPTION OF DRAWINGS

The following describes embodiments of this application in more details with reference to the accompanying drawings.

DESCRIPTION OF EMBODIMENTS

The following clearly and completely describes the technical solutions in embodiments of this application with reference to the accompanying drawings in the embodiments of this application.

A network architecture and a service scenario described in the embodiments of this application are intended to describe the technical solutions in the embodiments of this application more clearly and do not constitute a limitation on the technical solutions provided in the embodiments of this application. A person of ordinary skill in the art may learn that with the evolution of the network architecture and the emergence of new service scenarios, the technical solutions provided in the embodiments of this application are also applicable to similar technical problems.

A technology described in this application is applicable to, but is not limited to, a global system for mobile communications (GSM), a code division multiple access (CDMA) system, a wideband code division multiple access (WCDMA) system, a general packet radio service (GPRS), a long term evolution (LTE) system, an advanced long term evolution (LTE-A) system, an LTE frequency division duplex (FDD) system, an LTE time division duplex (TDD), a universal mobile telecommunication system (UMTS), a worldwide interoperability for microwave access (WiMAX) communications system, a next-generation communications system (such as a fifth-generation (5G) communications system), an integrated system of a plurality of access systems, three application scenarios of an evolved system and a next-generation 5G mobile communications system: eMBB, URLLC, and eMTC, or a future new communications system.

Figure 1:
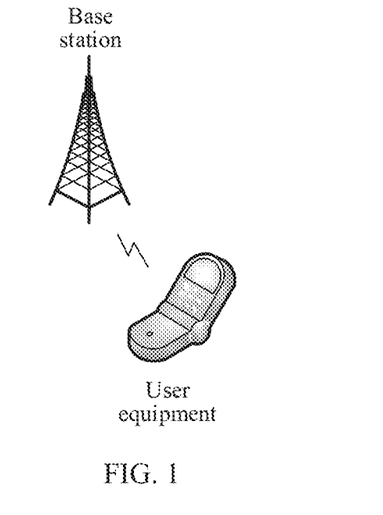
FIG. 1 is a schematic diagram of a possible application scenario according to this application.

FIG. 1 is a schematic diagram of a possible application scenario according to this application. User equipment (UE) communicates with an access network device such as a base station by using a radio interface. In this application, nouns "network" and "system" are usually interchangeably used, but a person skilled in the art can understand meanings of the nouns. User equipment in this application may include a handheld device, a vehicle-mounted device, a wearable device, a computing device, and a control device that have a wireless communication function, or another processing device connected to a wireless modem. UE in various forms, a mobile station (MS), a terminal, a terminal device (Terminal Equipment), a customer premises equipment (CPE), and the like. For ease of description, in this application, the devices mentioned above are collectively referred to as user equipment (UE). A network device in this application may be any device that has a wireless receiving and sending function or a chip that may be disposed in the device. The network device may be a base station (such as a NodeB, or an evolved NodeB (eNodeB)), a network device (such as a transmission point (TP)), a transmission reception point ((TRP), a base station, or a small base station device) in a fifth-generation (5G) communications system, a network device in a future communications system, an access node, a wireless relay node, or a wireless backhaul node in a wireless fidelity (WiFi) system, or the like. A base station is used as an example in this application or another device may perform content in this application.

In the solutions in this application, user equipment UE receives SRS resource configuration information sent by the base station. The UE receives downlink control information DCI sent by the base station. The UE sends an SRS in a determined slot and symbol, where the determined symbol is determined by the UE based on the SRS resource configuration information. In the SRS resource configuration information, at least two of a location of a start symbol S of a resource, in one slot, for transmitting the SRS, a quantity N of symbols of the resource for transmitting the SRS, and a repetition factor r of the resource for transmitting the SRS meet a constraint relationship. The location of the start symbol S of the resource, in one slot, for transmitting the SRS, the quantity N of symbols of the resource for transmitting the SRS, and the repetition factor r of the resource for transmitting the SRS are jointly encoded, and there is no need to separately configure the three parameters. This can effectively reduce configuration overheads and avoid incorrect configuration. By using current k0, k1, k2, and some other parameters, the UE may determine a time for sending the SRS. In this way, signaling overheads can be reduced, and SRS transmission performed through period-based or offset-based configuration information in the prior art is avoided, so that a time for triggering the SRS is more flexible.

The technical solutions provided in this application may be applied to uplink data transmission and/or downlink data transmission. For the uplink data transmission, a data sending device may be user equipment and a data receiving device may be a network side device, such as a base station. For the downlink data transmission, a data sending device may be a network side device, such as a base station and a data receiving device may be user equipment.

The following describes some general concepts or definitions in the embodiments of this application. It should be noted that some English abbreviations in this specification may change with the network evolution. For specific evolution, refer to descriptions in a corresponding standard.

The following describes in more details the solutions provided in the embodiments of this application with reference to the accompanying drawings.

Figure 2:
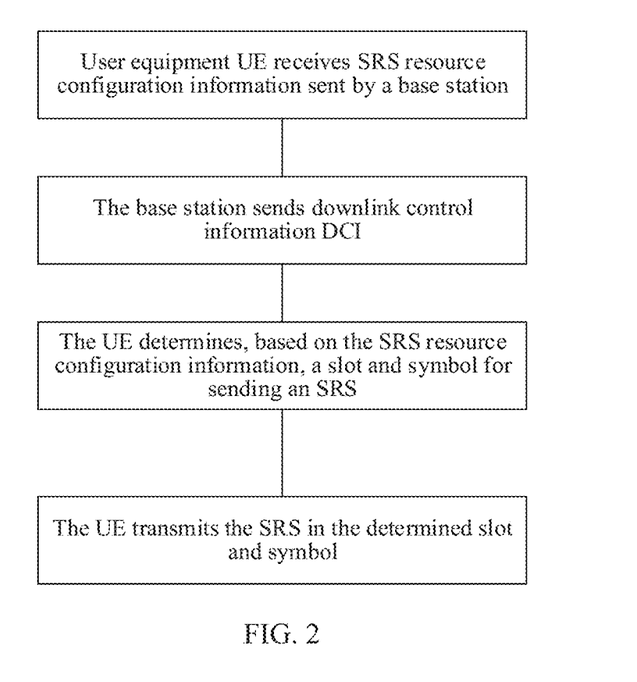
FIG. 2 is a schematic flowchart of an SRS transmission method according to an embodiment of this application.

FIG. 2 is a schematic flowchart of an SRS transmission method according to an embodiment of this application.

S201. A base station sends SRS resource configuration information to UE.

An SRS resource in this application is a resource that is configured by the base station for the UE and that is used to transmit a sounding reference signal SRS. A configuration of the SRS resource by a network device for a terminal device includes a configuration of a frequency domain resource, a configuration of a time domain resource, a configuration of code domain resource, and the like. This embodiment of this application mainly relates to the configuration of the time domain resource and the configuration of the frequency domain resource. One SRS resource may belong to one SRS resource set, and the SRS resource set may include one or more SRS resources.

The SRS resource configuration information may be used to indicate a time-frequency resource used to transmit the SRS, and the SRS resource configuration information includes information used to indicate a symbol for transmitting the SRS. Different SRS resource configuration information may be carried in different signaling, or may be carried in the same signaling.

The information that is included in the SRS resource configuration information and that is used to indicate the symbol for transmitting the SRS may be used to indicate content including:

1. A location of a start symbol S of the SRS resource in one slot, where the location of the start symbol may be located at one of the last six symbols in the slot.

2. A quantity N of symbols of the SRS resource, where a value range of the quantity N of symbols may be $\{1, 2, 4\}$.

3. A repetition factor r of the SRS resource, where a value range of the repetition factor r may be $\{1, 2, 4\}$, $r<=N$, and r is that in one SRS resource, every r consecutive symbols for transmitting the SRS are located at a same frequency domain location, that is, a same subcarrier.

A slot in this application may be a time unit, or may be a subframe, a slot, a mini-slot, a transmission time interval (TTI), or the like, and is not limited in this application.

Optionally, a relationship between S and N may be as follows:

Relationship 1: If a quantity of symbols in one slot is M, and M is 14. N symbols behind the start symbol for transmitting the SRS need to be in the slot. Therefore, if S is a symbol sequence number in the slot, for example, a value range of S is from M-A to M-1, if A is 6, the start symbol may be one of the last six symbols in the slot. In this case, $S+N<=M$. If S is a distance between the start symbol of the SRS resource and a last symbol in the slot, for example, a value range of S is from 0 to A-1, if A is 6, the start symbol is one of the last six symbols in the slot, and if S is 0, it indicates that the start symbol is the last symbol in the slot, that is, the start symbol is an $(S+1)^{th}$ symbol from the bottom in the slot. In this case, $S-N+1>=0$. Optionally, a value range of S may alternatively be from 1 to A, indicating that the start symbol is an $S^{th}$ symbol from the bottom in the slot. In this case, $S-N\geq 0$.

A relationship between r and N may be as follows:

Relationship 2: $r<=N$.

A relationship between r and S may be as follows:

Relationship 3: The relationship between r and S may be similar to the foregoing relationship between N and S, for example, may be $S+r<=M$, $S-r+1>=0$, or $S-r>=0$. This is not limited in this application.

Specifically, possible manners are listed in the following table.

Manner 1:

In Manner 1, the start symbol is separately encoded in Table 1, and the quantity of symbols of the SRS resource and the repetition factor of the SRS resource are jointly encoded. In other words, the quantity N of symbols and the repetition factor r in Table 2 may meet the foregoing relationship 2. The SRS resource configuration information sent by the base station may include a symbol configuration parameter of the SRS resource, and a symbol quantity configuration parameter of the SRS resource. The UE may obtain the start symbol through table lookup based on the symbol configuration parameter of the SRS resource, that is, $D_{SRS}$ in Table 1, and may obtain the quantity of symbols and the repetition factor based on the symbol quantity configuration parameter of the SRS resource. Therefore, the quantity of symbols of the SRS resource and the repetition factor of the SRS resource are jointly encoded, so that configuration signaling overheads can be reduced, and there is not a case in which the foregoing relationship 2 is not met.

TABLE 1

| Symbol configuration of an SRS resource $D_{SRS}$ | Start symbol S |
|---|---|
| 0-5 | $D_{SRS}$ |
|  | 5 − $D_{SRS}$ |
|  | 13 − $D_{SRS}$ |
|  | $D_{SRS}$ + 8 |
| 6-7 | reserved |

TABLE 2

| Symbol quantity configuration of an SRS resource | Quantity of symbols of the SRS resource N | Repetition factor r of the SRS resource |
|---|---|---|
| 0 | 1 | 1 |
| 1 | 2 | 1 |
| 2 | 2 | 2 |
| 3 | 4 | 1 |
| 4 | 4 | 2 |
| 5 | 4 | 4 |
| 6-7 | reserved | reserved |

Manner 2:

In Manner 2, the quantity of symbols of the SRS resource is separately encoded in Table 4, and the start symbol and the repetition factor of the SRS resource are jointly encoded in Table 3. In other words, the location of the start symbol S and the repetition factor r of the resource for transmitting the SRS may meet the foregoing relationship 3. The SRS resource configuration information sent by the base station may include a symbol configuration parameter that is configured for the SRS resource and that may be $D_{SRS}$ in Table 3, and a symbol quantity configuration parameter of the SRS resource. The UE may obtain the quantity of symbols of the SRS resource based on the $D_{SRS}$ and Table 3 and obtain the start symbol and the repetition factor based on the symbol quantity configuration parameter of the SRS resource. Therefore, the start symbol and the repetition factor are jointly encoded, so that configuration signaling overheads can be reduced, and there is not a case in which the foregoing relationship 3 is not met.

TABLE 3

| Symbol configuration of an SRS resource $D_{SRS}$ | Start symbol S | Repetition factor r of the SRS resource |
| --- | --- | --- |
| 0-5 | $D_{SRS}$<br>$5 - D_{SRS}$<br>$13 - D_{SRS}$ | 1 |
| 6-10 | $D_{SRS} + 8$<br>$D_{SRS} - 5$<br>$11 - D_{SRS}$<br>$18 - D_{SRS}$ | 2 |
| 11-13 | $D_{SRS} + 2$<br>$D_{SRS} - 8$<br>$16 - D_{SRS}$<br>$21 - D_{SRS}$<br>$D_{SRS} - 3$ | 4 |
| 14-15 | reserved | reserved |

TABLE 4

| Symbol quantity configuration of an SRS resource | Quantity of symbols of the SRS resource N |
| --- | --- |
| 0 | 1 |
| 1 | 2 |
| 2 | 4 |
| 3 | reserved |

Manner 3:

In Manner 3, the location of the start symbol of the SRS resource and the quantity of symbols of the SRS resource are jointly encoded in Table 5, and the repetition factor of the SRS resource is separately encoded in Table 6. That is, the foregoing relationship 1 is met. The SRS resource configuration information sent by the base station may include a symbol configuration parameter of the SRS resource and a repetition factor of the SRS resource. The UE obtains the start symbol of the SRS resource and the quantity of symbols of the SRS resource based on the symbol configuration parameter of the SRS resource and Table 5, and obtains the repetition factor of the SRS resource based on the repetition factor parameter of the SRS resource and Table 6. Therefore, the location of the start symbol of the SRS resource and the quantity of symbols of the SRS resource are jointly encoded, so that configuration signaling overheads can be reduced, and there is not a case in which the foregoing relationship 1 is not met.

TABLE 5

| Symbol configuration of an SRS resource $D_{SRS}$ | Start symbol S | Quantity of symbols of the SRS resource N |
| --- | --- | --- |
| 0-5 | $D_{SRS}$<br>$5 - D_{SRS}$<br>$13 - D_{SRS}$ | 1 |
| 6-10 | $D_{SRS} + 8$<br>$D_{SRS} - 5$<br>$11 - D_{SRS}$<br>$18 - D_{SRS}$ | 2 |
| 11-13 | $D_{SRS} + 2$<br>$D_{SRS} - 8$<br>$16 - D_{SRS}$<br>$21 - D_{SRS}$<br>$D_{SRS} - 3$ | 4 |
| 14-15 | reserved | reserved |

In addition, the repetition factor of the SRS resource is further configured in Table 6.

TABLE 6

| Repetition factor configuration of an SRS Resource | Repetition factor r of the SRS resource |
| --- | --- |
| 0 | 1 |
| 1 | 2 |
| 2 | 4 |
| 3 | reserved |

Manner 4:

In Manner 4, as shown in Table 7, the location of the start symbol S, the quantity of symbols of the SRS resource, and the repetition factor of the SRS resource are jointly encoded. That is, the three parameters meet the foregoing conditions 1, 2, and 3. The SRS resource configuration information sent by the base station may include a symbol configuration parameter of the SRS resource. The UE determines the location of the start symbol S, the quantity of symbols of the SRS resource, and the repetition factor of the SRS resource based on the symbol configuration parameter. In this way, the location of the start symbol S, the quantity of symbols of the SRS resource, and the repetition factor of the SRS resource are jointly encoded, so that configuration signaling overheads can be reduced, and there is not a case in which the foregoing relationships 1, 2, and 3 are not met, thereby avoiding incorrect configuration.

TABLE 7

| Symbol configuration of an SRS resource $D_{SRS}$ | Start symbol S | Quantity of symbols of the SRS resource N | Repetition factor r of the SRS resource |
| --- | --- | --- | --- |
| 0-5 | $D_{SRS}$<br>$5 - D_{SRS}$<br>$13 - D_{SRS}$ | 1 | 1 |
| 6-10 | $D_{SRS} + 8$<br>$D_{SRS} - 5$<br>$11 - D_{SRS}$<br>$18 - D_{SRS}$ | 2 | 1 |
| 11-15 | $D_{SRS} + 2$<br>$D_{SRS} - 10$<br>$16 - D_{SRS}$<br>$23 - D_{SRS}$<br>$D_{SRS} - 3$ | 2 | 7 |
| 16-18 | $D_{SRS} - 13$<br>$21 - D_{SRS}$<br>$26 - D_{SRS}$<br>$D_{SRS} - 8$ | 4 | 1 |

TABLE 7-continued

| Symbol configuration of an SRS resource $D_{SRS}$ | Start symbol S | Quantity of symbols of the SRS resource N | Repetition factor r of the SRS resource |
|---|---|---|---|
| 19-21 | $D_{SRS} - 16$<br>$24 - D_{SRS}$<br>$29 - D_{SRS}$<br>$D_{SRS} - 11$ | 4 | 2 |
| 22-24 | $D_{SRS} - 19$<br>$27 - D_{SRS}$<br>$32 - D_{SRS}$<br>$D_{SRS} - 14$ | 4 | 4 |
| 25-31 | reserved | reserved | reserved |

It should be noted that, in the foregoing embodiment, the start symbol S of the SRS resource is used to identify a first symbol of the SRS resource. Optionally, the start symbol S of the SRS resource may alternatively be used to identify a last symbol of the SRS resource. In this case, the relationship 1 and the relationship 3 in the foregoing embodiment are changed as follows:

Relationship 1n: A number of the first symbol of the SRS resource is not less than M-A. In this embodiment, A=6 is used as an example. In other words, a symbol occupied by the SRS resource is one or more of the last six symbols in the slot. Therefore, if S is represented by using a symbol number in one slot, S-N+1>=M-A is met. If S is represented by using a symbol interval between the last symbol of the SRS resource in one slot and the last symbol of the slot, that is, a value range of S is from 0 to A-1, the relationship 1 may be represented as S+N<=A.

Relationship 3n: Similar to the relationship between S and N in the relationship 1n, S-r+1>=M-A or S+r<=A is met.

Optionally, in the foregoing embodiment, four encoding and configuration manners of S, N, and r may be changed to manners in to 4n described below. The start symbol S is used to identify the last symbol of the SRS resource.

Manner in is the same as Manner 1. The start symbol S is used to identify the last symbol of the SRS resource. Details are not described herein again.

Manner 2n:

In Manner 2n, the quantity of symbols of the SRS resource is separately encoded in Table 4n, and the start symbol and the repetition factor of the SRS resource are jointly encoded in Table 3n. In other words, the location of the start symbol S and the repetition factor r of the resource for transmitting the SRS may meet the foregoing relationship 3n. The SRS resource configuration information sent by the base station may include a symbol configuration parameter that is configured for the SRS resource and that may be $D_{SRS}$ in Table 3n, and a symbol quantity configuration parameter of the SRS resource. The UE may obtain the quantity of symbols of the SRS resource based on the $D_{SRS}$ and Table 3n, and obtain the start symbol and the repetition factor based on the symbol quantity configuration parameter of the SRS resource. In this way, the start symbol and the repetition factor are jointly encoded so that configuration signaling overheads can be reduced, and it is ensured that there is not a case in which the foregoing relationship 3n is not met.

TABLE 3n

| Symbol configuration of an SRS resource $D_{SRS}$ | Start symbol S | Repetition factor r of the SRS resource |
|---|---|---|
| 0-5 | $D_{SRS}$<br>$5 - D_{SRS}$<br>$13 - D_{SRS}$<br>$D_{SRS} + 8$ | 1 |
| 6-10 | $D_{SRS} - 6$<br>$10 - D_{SRS}$<br>$19 - D_{SRS}$<br>$D_{SRS} + 3$ | 2 |
| 11-13 | $D_{SRS} - 11$<br>$13 - D_{SRS}$<br>$24 - D_{SRS}$<br>$D_{SRS}$ | 4 |
| 14-15 | reserved | reserved |

TABLE 4n

| Symbol quantity configuration of an SRS resource | Quantity of symbols of the SRS resource N |
|---|---|
| 0 | 1 |
| 1 | 2 |
| 2 | 4 |
| 3 | reserved |

Manner 3n:

In Manner 3n, the location of the start symbol of the SRS resource and the quantity of symbols of the SRS resource are jointly encoded in Table 5n, and the repetition factor of the SRS resource is separately encoded in Table 6n. That is, the foregoing relationship in is met. The SRS resource configuration information sent by the base station may include a symbol configuration parameter of the SRS resource and a repetition factor of the SRS resource. The UE obtains the start symbol of the SRS resource and the quantity of symbols of the SRS resource based on the symbol configuration parameter of the SRS resource and Table 5n, and obtains the repetition factor of the SRS resource based on the repetition factor parameter of the SRS resource and Table 6n. In this way, the location of the start symbol of the SRS resource and the quantity of symbols of the SRS resource are jointly encoded, so that configuration signaling overheads can be reduced and it is ensured that there is not a case in which the foregoing relationship in is not met.

TABLE 5n

| Symbol configuration of an SRS resource $D_{SRS}$ | Start symbol S | Quantity of symbols of the SRS resource N |
|---|---|---|
| 0-5 | $D_{SRS}$<br>$5 - D_{SRS}$<br>$13 - D_{SRS}$<br>$D_{SRS} + 8$ | 1 |
| 6-10 | $D_{SRS} - 6$<br>$10 - D_{SRS}$<br>$19 - D_{SRS}$<br>$D_{SRS} + 3$ | 2 |
| 11-13 | $D_{SRS} - 11$<br>$13 - D_{SRS}$<br>$24 - D_{SRS}$<br>$D_{SRS}$ | 4 |
| 14-15 | reserved | reserved |

In addition, the repetition factor of the SRS resource is further configured in

TABLE 6n

| Repetition factor configuration of an SRS Resource | Repetition factor r of the SRS resource |
|---|---|
| 0 | 1 |
| 1 | 2 |
| 2 | 4 |
| 3 | reserved |

Manner 4n:

In Manner 4n, as shown in Table 7n, the location of the start symbol S, the quantity of symbols of the SRS resource, and the repetition factor of the SRS resource are jointly encoded. That is, the three parameters meet the foregoing conditions 1n, 2, and 3n. The SRS resource configuration information sent by the base station may include a symbol configuration parameter of the SRS resource. The UE determines the location of the start symbol S, the quantity of symbols of the SRS resource, and the repetition factor of the SRS resource based on the symbol configuration parameter. In this way, the location of the start symbol S, the quantity of symbols of the SRS resource, and the repetition factor of the SRS resource are jointly encoded, so that configuration signaling overheads can be reduced, and it is ensured that there is not a case in which the foregoing relationship in, 2n, and 3n are not met.

TABLE 7n

| Symbol configuration of an SRS resource $D_{SRS}$ | Start symbol S | Quantity of symbols of the SRS resource N | Repetition factor r of the SRS resource |
|---|---|---|---|
| 0-5 | $D_{SRS}$<br>$5 - D_{SRS}$<br>$13 - D_{SRS}$<br>$D_{SRS} + 8$ | 1 | 1 |
| 6-10 | $D_{SRS} - 6$<br>$10 - D_{SRS}$<br>$19 - D_{SRS}$<br>$D_{SRS} + 3$ | 2 | 1 |
| 11-15 | $D_{SRS} - 11$<br>$15 - D_{SRS}$<br>$24 - D_{SRS}$<br>$D_{SRS} - 2$ | 2 | 2 |
| 16-18 | $D_{SRS} - 16$<br>$18 - D_{SRS}$<br>$29 - D_{SRS}$<br>$D_{SRS} - 5$ | 4 | 1 |
| 19-21 | $D_{SRS} - 19$<br>$21 - D_{SRS}$<br>$32 - D_{SRS}$<br>$D_{SRS} - 8$ | 4 | 2 |
| 22-24 | $D_{SRS} - 22$<br>$24 - D_{SRS}$<br>$35 - D_{SRS}$<br>$D_{SRS} - 11$ | 4 | 4 |
| 25-31 | reserved | reserved | reserved |

It should be noted that, a solution in which two or all of the start symbol, the quantity of symbols, and the repetition factor that are of the SRS resource are jointly encoded in this application may be independent of another technical feature in this embodiment of this application. This is not limited in this application.

Optionally, based on the foregoing manners, if in the SRS resource configuration information received by the UE, the location of the start symbol of the SRS resource, the quantity of symbols of the SRS resource, and the repetition factor of the SR resource meet one or more of the foregoing relationships, the UE sends a configured SRS. If in the SRS resource configuration information received by the UE, the location of the start symbol of the SRS resource, the quantity of symbols of the SRS resource, and the repetition factor of the SRS resource do not meet one or more of the foregoing relationships, the UE does not send a configured SRS.

Optionally, some rows or some columns of the tables in the foregoing manners may be used separately, or at least some rows or at least some columns may be used as a part of a complete configuration table. This is not limited herein. Values in the tables may be represented in another number system, such as a binary system.

It should be noted that there are four possible calculation methods for the start symbol S in the foregoing tables, and the four different calculation methods correspond to a same symbol configuration parameter of the SRS resource. All of the four calculation methods listed in the foregoing tables are merely examples, and only one of the calculation methods may be used during specific use. Specifically, S values obtained by using the first two calculation methods represent a quantity of symbols between the start symbol and the last symbol of the slot, and S values obtained by using the last two calculation methods represent symbol numbers of the start symbol.

The SRS resource belongs to the SRS resource set, and one SRS resource set includes one or more SRS resources. Optionally, the SRS resource configuration information may further include configuration information of the SRS resource set. The configuration information of the SRS resource set includes an SRS resource set function configuration. For example, SRS resource set functions may include at least two of beam management, antenna polling (antenna switching), codebook-based transmission, and non-codebook-based transmission.

Optionally, in the present invention, the base station may indicate, by sending the configuration information of the SRS resource set, that the SRS resource set has at least two functions, thereby reducing a quantity of times of sending the SRS, and implementing a plurality of functions only by sending a small quantity of SRSs.

Specifically, whether each function of the SRS is one of the SRS resource set functions may be indicated in a bitmap manner, or a combination may be selected from some possible function combinations by using signaling, as shown in the following table.

TABLE 8

| SRS resource set function configuration parameter | SRS resource set functions |
|---|---|
| 0 | Beam Management |
| 1 | Antenna polling |
| 2 | Codebook-based transmission |
| 3 | Non-codebook-based transmission |
| 4 | Beam management and antenna polling |
| 5 | Codebook-based transmission and antenna polling |
| 6 | Non-codebook-based transmission and antenna polling |

The function combinations in the foregoing table are merely examples. The combination may be selected from only some of the function combinations and another function combination may further be included.

When a plurality of functions is configured for a particular SRS resource set, the SRS resource set needs to meet a constraint of each of the plurality of configured functions. Details are as follows:

1. When the SRS resource set functions include a beam management function, SRS resources in a same SRS resource set need to be on different symbols and have a same period.

Optionally, the base station may indicate an SRS resource in one or more SRS resource sets, so that the UE sends an SRS, a PUSCH, or a PUCCH by using a transmit beam on the indicated SRS resource. Alternatively, the beam may be a spatial dimension transmission filter.

2. When the SRS resource set functions include an antenna selection function, resources in the SRS resource set are classified into j groups of SRS resources, each group includes one or more SRS resources, and for SRS resources in each group, a same antenna or antenna group is used for sending, and the used antenna or antenna group is kept unchanged. SRSs are sent on SRS resources in different groups by using different antennas or antenna groups, and the different antenna groups are antenna groups including at least one different antenna. The antenna may be a physical antenna, a virtual antenna, a user transmission port, a user port, or the like.

3. When the SRS resource set functions include a codebook-based transmission function, the base station indicates at least one SRS resource in the SRS resource set and corresponding codebook information, so that the UE performs PUSCH transmission on a port of the indicated SRS resource by using a codebook determined based on the codebook information.

4. When the SRS resource set functions include a non-codebook-based transmission function, the base station may indicate a CSI-RS resource associated with the SRS resource set, and the UE determines precoding on an SRS resource in the SRS resource set based on measurement on the CSI-RS resource. Optionally, the base station may indicate an SRS resource in one or more SRS resource sets, so that the UE sends a PUSCH through precoding on the indicated SRS resource.

An SRS resource configuration in this application is applicable to a periodic SRS resource configuration, a semi-persistent SRS resource configuration, or an aperiodic SRS resource configuration. Details are not described in this application.

It should be noted that the foregoing technical solution in which two or more functions are simultaneously configured for one SRS resource set in this application may be independent of another technical feature in this embodiment of this application. This is not limited in this application.

S202. The base station sends downlink control information (DCI).

The DCI may be used to trigger at least one SRS resource or resource set. Herein, a number of a slot in which the UE receives the DCI is denoted as n, that is, the UE receives the DCI in an $n^{th}$ slot. The DCI may be downlink DCI used for downlink scheduling or uplink DCI used for uplink scheduling.

Optionally, the DCI is the downlink DCI and the DCI may be DCI that includes physical downlink shared channel (PDSCH) scheduling information, or the DCI includes a PDSCH time domain information indication and an indication of time information from a PDSCH to an HARQ-ACK feedback. A format of the DCI may be 1_0 or 1_1.

Optionally, the DCI is the uplink DCI. The DCI may be DCI that includes physical uplink shared channel (PUSCH) scheduling information, or the DCI includes a PUSCH time domain information indication. A format of the DCI may be 1_0 or 1_1.

S203. The UE determines, based on the received SRS resource configuration information, a slot and symbol for sending an SRS.

A slot in which the UE sends the SRS is an $(n+k)^{th}$ slot.

A: Specifically, if the DCI is the downlink DCI, the DCI may be DCI that includes physical downlink shared channel (PDSCH) scheduling information, or the DCI includes a PDSCH time domain information indication and an indication of time information from a PDSCH to an HARQ-ACK feedback. A k value may be calculated in the following manner.

Optionally, $k=k0+k1+(X-1)+\Delta DL$, where k0 indicates a quantity of slots between the DCI and a first slot in which scheduled downlink transmission (for example, a PDSCH) is located. That is, the downlink transmission starts in an $(n+k0)^{th}$ slot; and k1 is a quantity of slots between an end of the downlink transmission and an uplink feedback corresponding to the downlink transmission. To be specific, if a last slot of the downlink transmission is a slot m, uplink transmission is performed in an $(m+k1)^{th}$ slot. Optionally, the uplink feedback may be performed through a PUCCH or a PUSCH, and the uplink feedback may include HARQ-ACK information. X is a quantity of slots in slot aggregation during the downlink transmission. That is, the quantity of slots occupied by the current downlink transmission. This value may be configured. If the value is not configured, the value may be 1, or the value may be configured by using higher layer signaling aggregation-factor-DL.

$\Delta DL$ may be a configured value, such as 0, or may be a non-zero value, such as 1 or -1. Alternatively, $\Delta DL$ is a value determined based on a symbol occupied by a channel of the uplink feedback. For example, $\Delta DL$ may be determined based on a symbol for PUCCH transmission. When the symbol for carrying the PUCCH is different from the symbol for the SRS, $\Delta DL$ is 0. When the symbol for carrying the PUCCH is partially or completely the same as the symbol for the SRS, or a sum of the symbol for carrying the PUCCH and the symbol for the SRS exceeds a total quantity of symbols in a slot, for example, if the sum exceeds 14, $\Delta DL$ is not 0, and may be a predefined value or a quantity of slots for carrying the PUCCH. Alternatively, $\Delta DL$ is a value determined based on a slot that may be used to transmit the SRS. For example, $\Delta DL$ meets the following condition: a slot $n+k0+k1+(X-1)+\Delta DL$ is a slot $n+k0+k1+(X-1)$ or after the slot $n+k0+k1+(X-1)$, a first slot that may transmit the SRS. Alternatively, a slot $n+k0+k1+(X-1)+\Delta DL$ is a slot $n+k0+k1+(X-1)$ or before the slot $n+k0+k1+(X-1)$, a first slot that may transmit the SRS. Optionally, to ensure that the SRS of the UE is not beyond a capability of the UE during an excessively small interval between the SRS of the UE and the transmitted DCI, $\Delta DL$ may further have a minimum value, and may be adjusted or predefined based on the capability of the UE.

The foregoing k0, k1, X, and $\Delta DL$ may be further applied to another embodiment in this application. Details are not described in this application again.

It should be understood that the symbol that is of the SRS resource and that is determined based on the foregoing method is an uplink symbol. If at least one symbol of the SRS resource is not an uplink symbol, $\Delta DL$ may be further decreased by 1 (when the value is less than 0) or increased by 1 (when the value is greater than 0), and then it is determined whether a remaining symbol in the SRS resource is an uplink symbol, and so on. Optionally, ΔDL may have a predefined minimum value or maximum value.

In this solution, the symbol for the SRS in one slot is determined based on the SRS resource configuration.

If there is no slot that meets the foregoing conditions, the UE does not send the SRS this time.

Optionally, the k value may alternatively be k=k0+k1+ΔDL, k=k1+ΔDL, k=k0+ΔDL, k=k0+(X−1)+ΔDL, or k=k1+(X−1)+ΔDL.

Optionally, the k value may alternatively be k=k0+k1+(X−1), k=k0+k1, k=k1, k=k0, k=k0+(X−1), or k=k1+(X−1).

Optionally, when there is no identical symbol between the symbol for carrying the SRS and the symbol for carrying the PUCCH, the UE normally sends the SRS.

When there is at least one identical symbol between the symbol for carrying the SRS and the symbol for carrying the PUCCH, the start symbol of the SRS resource changes, so that the changed SRS and the PUCCH have no identical symbol.

If a quantity M of remaining symbols in the last six symbols is less than the quantity of symbols of the SRS resource, the UE does not transmit the SRS, or transmits, only on the remaining symbols, the first M symbols of the SRS resource.

If a quantity M of remaining symbols in the last six symbols is greater than or equal to the quantity of symbols of the SRS resource, the start symbol of the SRS resource is changed to a first symbol of available symbols, or the last symbol of the SRS resource is changed to a last symbol of available symbols.

If a sum of a quantity of symbols for the SRS and a quantity of symbols for the PUCCH is greater than a quantity of symbols in a slot, for example, 14, the UE does not transmit the SRS.

B: If the DCI is the uplink DCI, the DCI may be DCI that includes physical uplink shared channel (PUSCH) scheduling information, or the DCI includes a PUSCH time domain information indication. A k value may be calculated in the following manner.

Optionally, k=k2+ΔUL, where k2 is a slot interval between the DCI and the scheduled uplink transmission (such as the PUSCH). ΔUL may be a configured value, such as 0, or may be a non-zero value, such as 1 or −1. Alternatively, ΔUL is determined based on a symbol occupied by a channel of the uplink transmission. For example, when a symbol for carrying the PUSCH is different from the symbol for the SRS, ΔUL=0. When the symbol for carrying the PUSCH is partially the same as the symbol for the SRS, ΔUL is a preset value, such as 1 or −1, or may be a quantity of slots in the uplink UL transmission this time. Alternatively, ΔUL is a value determined based on a slot that may be used to transmit the SRS. For example, ΔUL meets the following condition: a slot n+k2+ΔUL is a slot n+k2 or after the slot n+k2, a first slot that may transmit the SRS. Alternatively, a slot n+k2+ΔUL is a slot n+k2 or before the slot n+k2, a first slot that may transmit the SRS.

Optionally, for a triggered SRS and scheduled PUSCH transmission that are performed by the same DCI, a priority of the SRS may be higher than a priority of the PUSCH. In this way, when a plurality of slots are scheduled for the PUSCH transmission, the SRS may be sent in one of the plurality of slots, and a quantity of symbols for the PUSCH in the slot is relatively small, and a quantity of symbols for the PUSCH in other slots may be relatively large, so that resources are not wasted.

For the triggered SRS and the scheduled PUSCH transmission that are performed by the same DCI, if the SRS is transmitted in a slot in which a particular PUSCH is located, the PUSCH transmission may be performed on a symbol, in another slot, that is the same as the symbol for the SRS in the slot, so that resources are not wasted. For example, the PUSCH occupies a slots, and the SRS transmission is performed in an $i^{th}$ slot of the a slots. The SRS transmission occupies a symbol b to a symbol c, and b<=c. The PUSCH transmission is not performed between the symbol b and the symbol c in the $i^{th}$ slot, and may be performed between a symbol b to a symbol c in a−1 slots other than the $i^{th}$ slot in the a slots.

Optionally, k=k2.

If there is no identical symbol between the symbol for carrying the SRS and the symbol for carrying the PUSCH, the UE sends the SRS.

If there is at least one identical symbol between the symbol for carrying the SRS and the symbol for carrying the PUSCH, the start symbol for carrying the SRS resource changes, so that there is no identical symbol between a changed symbol for carrying the SRS resource and the symbol for carrying the PUSCH.

If a quantity M of remaining symbols in the last six symbols is less than the quantity of symbols of the SRS resource, the UE does not transmit the SRS, or transmits, on the remaining symbols, the first M symbols of the SRS resource.

If a quantity M of remaining symbols in the last six symbols is greater than or equal to the quantity of symbols of the SRS resource, the start symbol of the SRS resource is changed to a first symbol of available symbols, or the last symbol of the SRS resource is changed to a last symbol of available symbols.

If a sum of a quantity of symbols for the SRS and a quantity of symbols for the PUSCH is greater than a quantity of symbols in a slot, for example, 14, the UE does not send the SRS.

S204. The UE transmits the SRS in the determined slot and symbol.

If the UE determines, in the foregoing steps, the slot and symbol for sending the SRS, the UE transmits the SRS in the determined slot and symbol. If the UE does not determine, in the foregoing steps, the slot and symbol for sending the SRS, the UE may not transmit the SRS this time.

Therefore, in this embodiment of this application, in the SRS resource configuration information, at least two of the location of the start symbol S of the resource, in one slot, for transmitting the SRS, the quantity N of symbols of the resource for transmitting the SRS, and the repetition factor r of the resource for transmitting the SRS meet a constraint relationship. The location of the start symbol S of the resource, in one slot, for transmitting the SRS, the quantity N of symbols of the resource for transmitting the SRS, and the repetition factor r of the resource for transmitting the SRS are jointly encoded, and there is no need to separately configure the three parameters. This can effectively reduce configuration overheads and avoid incorrect configuration. By using current k0, k1, k2, and some other parameters, the UE may determine a time for sending the SRS. In this way, signaling overheads can be reduced, and the SRS transmission performed through period-based or offset-based configuration information in the prior art is avoided, so that a time for triggering the SRS is more flexible.

In another embodiment of this application, the DCI in S202 may include content used to indicate a k value. For example, a field in the DCI indicates the k value, and one of a plurality of candidate values may be selected as the k value. Alternatively, the DCI includes content used to indicate that the k value is a value in a candidate set of k values. The candidate set of the k values may be a candidate set of k0 values, a candidate set of k1 values, or a candidate set of k2 values, or the candidate set of the k values is configured by using higher layer signaling. Therefore, the UE may determine, based on the indication of the k value in the DCI or the higher layer signaling, the time for transmitting the SRS.

The candidate set of the k0 values is a candidate set of a quantity of slots between the DC and a first slot in which downlink transmission scheduled by the DC is located, for example, may be a candidate set of k0 configured by using higher layer signaling, that is, a plurality of candidate k0 values.

The candidate set of the k1 values is a candidate set of a quantity of slots between an end of the downlink transmission scheduled by the DCI and an uplink feedback corresponding to the downlink transmission, for example, may be configured by using higher layer signaling slotTimingValueK1 or Slot-timing-value-K1, that is, a plurality of candidate k1 values.

The candidate set of the k2 values is a candidate set of slot intervals between the DCI and uplink transmission scheduled by the DCI, for example, may be a candidate set of k2 configured by using higher layer signaling, that is, a plurality of candidate k2 values.

It should be noted that the technical solution in which the UE determines the slot for transmitting the SRS in this embodiment of this application may be independent of another feature in this embodiment of this application. This is not limited in this application.

Figure 3:
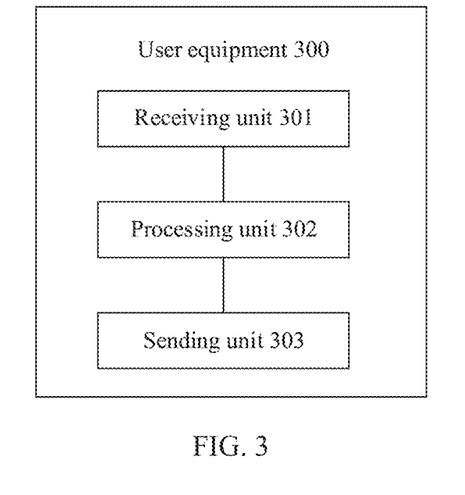
FIG. 3 is a schematic block diagram of user equipment according to an embodiment of this application.

FIG. 3 is a schematic block diagram of user equipment according to an embodiment of this application. As shown in FIG. 3, the equipment includes a receiving unit 301, a processing unit 302, and a sending unit 303.

The receiving unit 301 is configured to receive SRS resource configuration information sent by a base station, and is further configured to receive downlink control information DCI sent by the base station.

The sending unit 303 is configured to send an SRS in a determined slot and symbol. The determined symbol is determined by the processing unit 302 based on the SRS resource configuration information.

Each unit and the foregoing another operation or function of the user equipment UE 300 in this embodiment of this application is separately used for implementing a corresponding procedure performed by a terminal device in an SRS transmission method. Details are not described herein again.

Figure 4:
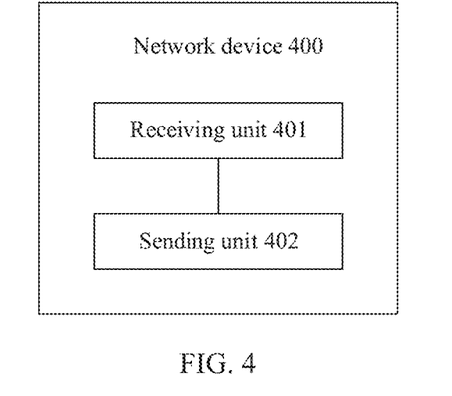
FIG. 4 is a schematic block diagram of a network device according to an embodiment of this application.

FIG. 4 is a schematic block diagram of a network device according to an embodiment of this application. The network device may be a base station. As shown in FIG. 4, the network device includes a receiving unit 401 and a sending unit 402.

The sending unit 402 is configured to send SRS resource configuration information to user equipment UE, and is configured to send downlink control information DCI to the UE.

The receiving unit 401 is configured to receive an SRS sent by the UE based on the SRS resource configuration information.

Each unit and the foregoing another operation or function of the network device 400 in this embodiment of this application is separately used for implementing a corresponding procedure performed by a network device in an SRS transmission method. For brevity, details are not described herein again.

Figure 5:
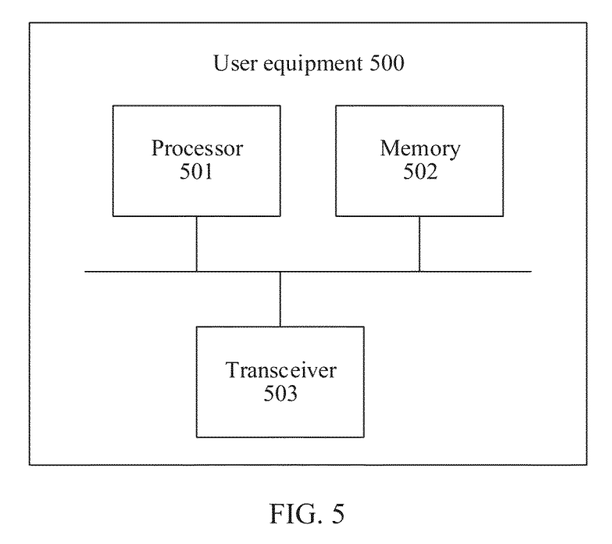
FIG. 5 is a schematic structural diagram of user equipment according to an embodiment of this application.

FIG. 5 is a schematic structural diagram of user equipment 500 according to an embodiment of this application. As shown in FIG. 5, the user equipment 500 includes one or more processors 501, one or more memories 502, and one or more transceivers 503. The processor 501 is configured to control the transceiver 503 to receive and send a signal. The memory 502 is configured to store a computer program. The processor 501 is configured to: invoke the computer program from the memory 502 and run the computer program, so that the user equipment 500 performs an SRS transmission method. For brevity, details are not described herein again.

Figure 6:
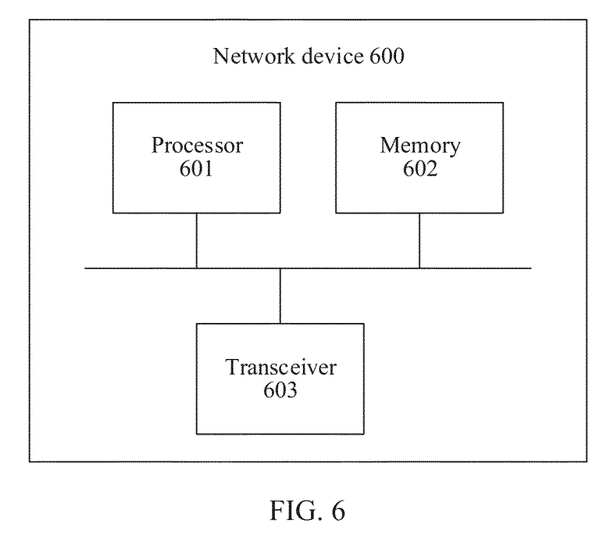
FIG. 6 is a schematic structural diagram of a network device according to an embodiment of this application.

FIG. 6 is a schematic structural diagram of a network device 600 according to an embodiment of this application. As shown in FIG. 6, the network device 600 includes one or more processors 601, one or more memories 602, and one or more transceivers 603. The processor 601 is configured to control the transceiver 603 to receive and send a signal. The memory 602 is configured to store a computer program. The processor 601 is configured to: invoke the computer program from the memory 602 and run the computer program, so that the network device 600 performs a reference signal sending method. For brevity, details are not described herein again.

In addition, this application further provides a computer program product. The computer program product includes computer program code. When the computer program code is run on a computer, the computer is enabled to perform a corresponding procedure and/or operation that are/is performed by a terminal device in the foregoing reference signal sending method.

In addition, this application further provides a computer-readable medium. The computer-readable medium stores program code. When the computer program code is run on a computer, the computer is enabled to perform a corresponding procedure and/or operation that are/is performed by a terminal device in the foregoing reference signal sending.

In addition, this application further provides a chip system. The chip system includes a processor, configured to support a terminal device in implementing functions in the foregoing reference signal sending method, for example, receiving or processing data and/or information in the foregoing method. In a possible design, the chip system further includes a memory. The memory is configured to store a program instruction and data that are necessary for the terminal device. The chip system may include a chip, or may include a chip and another discrete device.

In addition, this application further provides a chip system. The chip system includes a processor, configured to support a network device in implementing functions in the foregoing reference signal sending method, for example, sending or processing data and/or information in the foregoing method. In a possible design, the chip system further includes a memory, and the memory is configured to store a program instruction and data that are necessary for the network device. The chip system may include a chip or may include a chip and another discrete device.

In the foregoing embodiments, the processor may be a central processing unit (CPU), a microprocessor, an application-specific integrated circuit (ASIC), one or more integrated circuits configured to control execution of programs of the solutions of this application, and the like. For example, the processor may include a digital signal processor device, a microprocessor device, an analog-to-digital converter, a digital-to-analog converter, and the like. The processor may allocate control and signal processing functions of a mobile device between devices based on respective functions of the devices. In addition, the processor may include functions for operating one or more software programs, and the software programs may be stored in a memory.

The functions of the processor may be implemented by hardware, or may be implemented by hardware executing corresponding software. The hardware or software includes one or more modules corresponding to the foregoing functions.

The memory may be a read-only memory (ROM) or another type of static storage device that can store static information and an instruction, or a random access memory (RAM) or another type of dynamic storage device that can store information and an instruction. The memory may alternatively be an electrically erasable programmable read-only memory (EEPROM), a compact disc read-only memory (CD-ROM), or another compact disc storage, optical disc storage (which includes a compact disc, a laser disc, an optical disc, a digital versatile disc, a Blu-ray disc, and the like), a magnetic disk storage medium or another magnetic storage device, or any other medium that can be used to carry or store expected program code having an instruction or a data structure form and that can be accessed by a computer. However, this is not limited herein.

Optionally, the memory and the memory may be physically independent units, or the memory may be integrated into the processor.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding procedure in the foregoing method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communications connections may be implemented by using some interfaces. The indirect couplings or communications connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit.

With reference to the foregoing descriptions, a person skilled in the art may be aware that the methods of the embodiments in this specification may be implemented by hardware (such as a logic circuit) or software, or a combination of hardware and software. Whether the methods are performed by hardware or software depends on particular applications and design constraint conditions of the technical solutions. A person skilled in the art may use different methods to implement the described functions for each particular application, but it should not be considered that the implementation goes beyond the scope of this application.

When the foregoing functions are implemented in a form of software and sold or used as an independent product, the functions may be stored in a computer-readable storage medium. In this case, the technical solutions in this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the method described in the embodiments of this application. The foregoing storage medium includes: each medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A sounding reference signal (SRS) transmission method, comprising:
   receiving, by user equipment (UE), SRS resource configuration information from a base station, wherein the SRS resource configuration information comprises information that indicates a location of a start symbol S of a resource, in one slot, for transmitting the SRS, and a quantity N of symbols of the resource for transmitting the SRS;
   receiving, by the UE, downlink control information (DCI) from the base station; and
   sending, by the UE, an SRS in a determined slot and symbol, wherein the determined symbol is determined by the UE based on the SRS resource configuration information.

2. The method according to claim 1, wherein the UE receives the DCI in an $n^{th}$ slot, the slot that is determined by the UE and in which the SRS is sent is an $(n+k)^{th}$ slot, and
   $k=k0+k1+(X-1)+\Delta DL$;
   $k=k0+k1+\Delta DL$;
   $k=k1+\Delta DL$;
   $k=k0+\Delta DL$;
   $k=k0+(X-1)+\Delta DL$;
   $k=k1+(X-1)+\Delta DL$;
   $k=k0+k1+(X-1)$;
   $k=k0+k1$;

k=k1;
k=k0;
k=k0+(X−1); or
k=k1+(X−1), wherein
  k0 is a quantity of slots between the DCI and a first slot in which downlink transmission scheduled by the DCI is located, k1 is a quantity of slots between an end of the downlink transmission and an uplink feedback corresponding to the downlink transmission, X is 1 or a quantity of slots in slot aggregation during the downlink transmission, and
  ΔDL is a configured value, or ΔDL is determined based on a symbol occupied by a channel of the uplink feedback, or ΔDL is a value determined based on a slot that is used to transmit the SRS.

3. The method according to claim 1, wherein the UE receives the DCI in an $n^{th}$ slot, the slot that is determined by the UE and in which the SRS is sent is an $(n+k)^{th}$ slot, and
k=k2+ΔUL, or
k=k2, wherein
  k2 is a quantity of slot intervals between the DCI and uplink transmission scheduled by the DCI, and
  ΔUL is a configured value, or ΔUL is a value determined based on a symbol occupied by a channel of the uplink transmission, or ΔUL is a value determined based on a slot for transmitting the SRS, or ΔUL is a value determined based on a quantity of slots in slot aggregation during the uplink transmission.

4. The method according to claim 1, wherein the UE receives the DCI in an $n^{th}$ slot, the slot that is determined by the UE and in which the SRS is sent is an $(n+k)^{th}$ slot, and k is indicated by the DCI, or k is a pre-configured value.

5. The method according to claim 4, wherein
  the DCI comprises content indicating that a value of k is one of a candidate set of k values, and the candidate set of the k values is one of the following: a candidate set of k0 values, a candidate set of k1 values, and a candidate set of k2 values, wherein
  the candidate set of the k0 values is a candidate set of a quantity of slots between the DCI and a first slot in which downlink transmission scheduled by the DCI is located,
  the candidate set of the k1 values is a candidate set of a quantity of slots between an end of the downlink transmission scheduled by the DCI and an uplink feedback corresponding to the downlink transmission, and
  the candidate set of the k2 values is a candidate set of slot intervals between the DCI and uplink transmission scheduled by the DCI.

6. The method according to claim 1, wherein the SRS resource configuration information comprises information that indicates a repetition factor r of the resource for transmitting the SRS, and at least two of S, N, or r are jointly encoded.

7. The method according to claim 1, wherein the SRS resource configuration information comprises configuration information that indicates an SRS resource set, the SRS resource set comprises one or more SRS resources, and the SRS resource configuration information further comprises information that indicates that the SRS resource set has at least two of four following functions: beam management, antenna polling, codebook-based transmission, and non-codebook-based transmission.

8. A sounding reference signal (SRS) transmission method, comprising:
  sending, by a base station, SRS resource configuration information to user equipment (UE) wherein the SRS resource configuration information comprises information that indicates a location of a start symbol S of a resource, in one slot, for transmitting the SRS, and a quantity N of symbols of the resource for transmitting the SRS;
  sending, by the base station, downlink control information (DCI) to the UE; and
  receiving, by the base station, an SRS from the UE based on the SRS resource configuration information.

9. The method according to claim 8, wherein the base station sends the DCI to the UE in an $n^{th}$ slot and receives the SRS in an $(n+k)^{th}$ slot, and
  the DCI comprises content that indicates a value of k; or
  the DCI comprises content that indicates that a value of k is one of a candidate set of k values, and the candidate set of the k values is one of the following: a candidate set of k0 values, a candidate set of k1 values, and a candidate set of k2 values, wherein
  the candidate set of the k0 values is a candidate set of a quantity of slots between the DCI and a first slot in which downlink transmission scheduled by the DCI is located,
  the candidate set of the k1 values is a candidate set of a quantity of slots between an end of the downlink transmission scheduled by the DCI and an uplink feedback corresponding to the downlink transmission, and
  the candidate set of the k2 values is a candidate set of slot intervals between the DCI and uplink transmission scheduled by the DCI.

10. The method according to claim 8, wherein the SRS resource configuration information comprises information that indicates a repetition factor r of the resource for transmitting the SRS, and at least two of S, N, or r are jointly encoded.

11. The method according to claim 8, wherein the SRS resource configuration information comprises configuration information that indicates an SRS resource set, the SRS resource set comprises one or more SRS resources, and the SRS resource configuration information further comprises information that indicates that the SRS resource set has at least two of four functions: beam management, antenna polling, codebook-based transmission, and non-codebook-based transmission.

12. A communications apparatus, comprising:
  a receiver, configured to:
  receive configuration information of a sounding reference signal (SRS) resource from a base station, wherein the configuration information of the SRS resource comprises information that indicates a location of a start symbol S of a resource, in one slot, for transmitting the SRS, and a quantity N of symbols of the resource for transmitting the SRS; and
  receive downlink control information (DCI) from the base station; and
  a transmitter, configured to send an SRS in a determined slot and symbol, wherein the determined symbol is determined by at least one processor of the communications apparatus based on the configuration information of the SRS resource.

13. The communications apparatus according to claim 12, wherein the receiver receives the DCI in an $n^{th}$ slot, the slot that is determined by the at least one processor and in which the SRS is sent is an $(n+k)^{th}$ slot, and $k=k0+k1+(X-1)+\Delta DL$;
$k=k0+k1+\Delta DL$;
$k=k1+\Delta DL$;
$k=k0+\Delta DL$;
$k=k0+(X-1)+\Delta DL$;
$k=k1+(X-1)+\Delta DL$;
$k=k0+k1+(X-1)$;
$k=k0+k1$;
$k=k1$;
$k=k0$;
$k=k0+(X-1)$; or
$k=k1+(X-1)$, wherein
k0 is a quantity of slots between the DCI and a first slot in which downlink transmission scheduled by the DCI is located, k1 is a quantity of slots between an end of the downlink transmission and an uplink feedback corresponding to the downlink transmission, X is 1 or a quantity of slots in slot aggregation during the downlink transmission, and $\Delta DL$ is a configured value, or $\Delta DL$ is determined based on a symbol occupied by a channel of the uplink feedback, or $\Delta DL$ is a value determined based on a slot that is used to transmit the SRS.

14. The communications apparatus according to claim 12, wherein the receiver receives the DCI in an $n^{th}$ slot, the slot that is determined by the at least one processor and in which the SRS is sent is an $(n+k)^{th}$ slot, and $k=k2+\Delta UL$, or
$k=k2$, wherein
k2 is a quantity of slot intervals between the DCI and uplink transmission scheduled by the DCI, and $\Delta UL$ is a configured value, or $\Delta UL$ is a value determined based on a symbol occupied by a channel of the uplink transmission, or $\Delta UL$ is a value determined based on a slot for transmitting the SRS, or $\Delta UL$ is a value determined based on a quantity of slots in slot aggregation during the uplink transmission.

15. The communications apparatus according to claim 12, wherein the receiver receives the DCI in an $n^{th}$ slot, the slot that is determined by the at least one processor and in which the SRS is sent is an $(n+k)^{th}$ slot, and k is indicated by the DCI, or k is a pre-configured value.

16. The communications apparatus according to claim 15, wherein the DCI comprises content indicating that a value of k is one of a candidate set of k values, and the candidate set of the k values is one of the following: a candidate set of k0 values, a candidate set of k1 values, and a candidate set of k2 values, wherein the candidate set of the k0 values is a candidate set of a quantity of slots between the DCI and a first slot in which downlink transmission scheduled by the DCI is located, the candidate set of the k1 values is a candidate set of a quantity of slots between an end of the downlink transmission scheduled by the DCI and an uplink feedback corresponding to the downlink transmission, and the candidate set of the k2 values is a candidate set of slot intervals between the DCI and uplink transmission scheduled by the DCI.

17. The communications apparatus according to claim 12, wherein the configuration information of the SRS resource comprises information that indicates the symbol for transmitting the SRS, the information that indicates a repetition factor r of the resource for transmitting the SRS, and at least two of S, N, or r are jointly encoded.

18. The communications apparatus according to claim 12, wherein the configuration information of the SRS resource comprises configuration information that indicates an SRS resource set, the SRS resource set comprises one or more SRS resources, and the configuration information of the SRS resource further comprises information that indicates that the SRS resource set has at least two of four following functions: beam management, antenna polling, codebook-based transmission, and non-codebook-based transmission.

* * * * *